Figure 1:
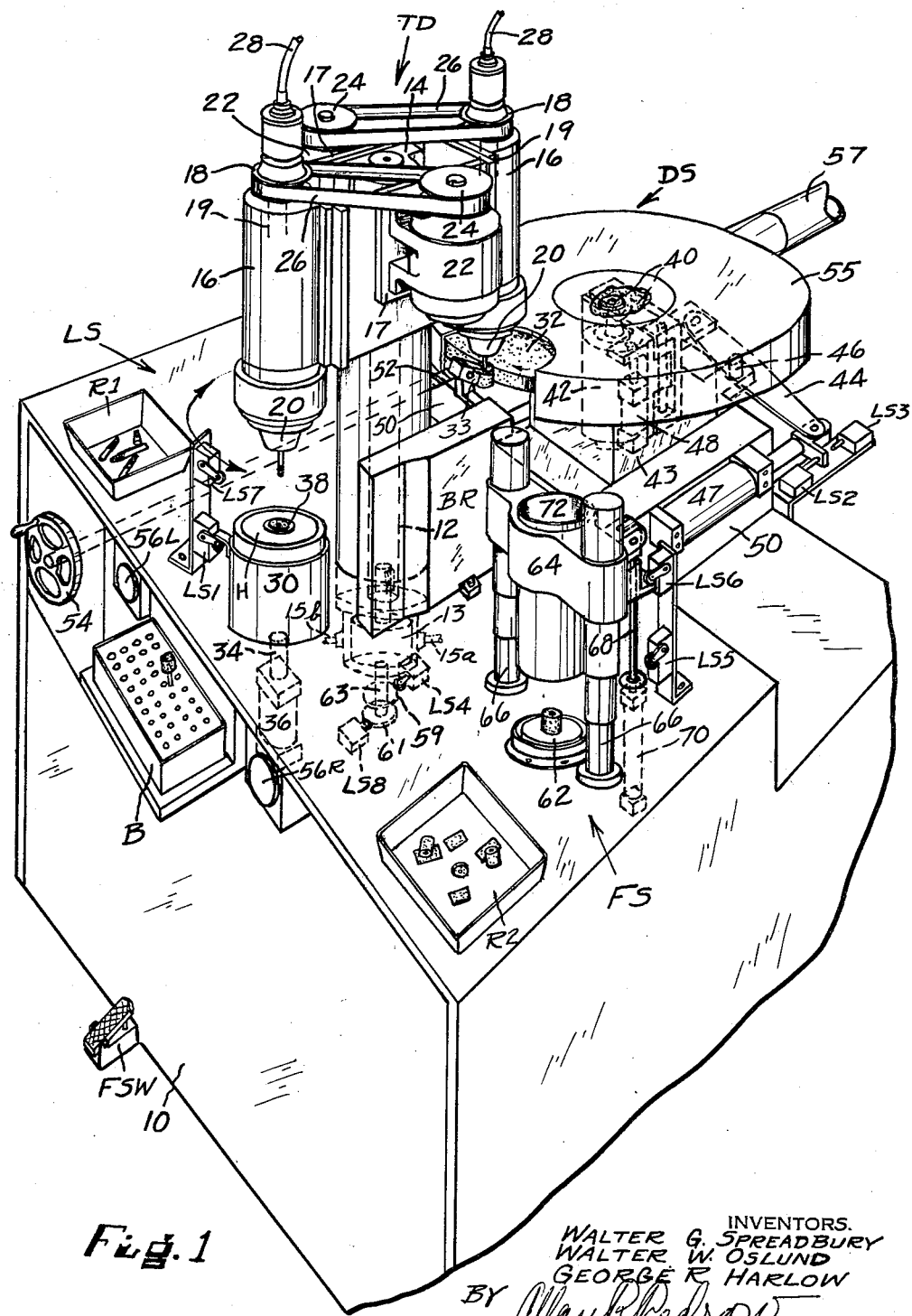

Nov. 5, 1963  W. G. SPREADBURY ETAL  3,109,261
APPARATUS FOR THE MANUFACTURE OF SPINDLE
SUPPORTED MOUNTED POINTS
Filed Sept. 19, 1962  2 Sheets-Sheet 1

INVENTORS.
WALTER G. SPREADBURY
WALTER W. OSLUND
GEORGE R. HARLOW
BY Allan R. Redrow
ATTORNEY

INVENTORS.
WALTER G. SPREADBURY
WALTER W. OSLUND
GEORGE R. HARLOW
ATTORNEY 3,109,261
APPARATUS FOR THE MANUFACTURE OF
SPINDLE SUPPORTED MOUNTED POINTS
Walter G. Spreadbury, Northboro, Walter W. Oslund, Worcester, and George R. Harlow, West Boylston, Mass., assignors to Norton Company, Worcester, Mass., a corporation of Massachusetts
Filed Sept. 19, 1962, Ser. No. 224,804
16 Claims. (Cl. 51—5)

This invention relates to the manufacture of spindle supported grinding points and more especially to apparatus similar to that disclosed in a co-pending application of Eves, filed November 10, 1961, Serial No. 151,521, for attaching relatively small grinding wheels or so-called mounted points to their driving spindles and as herein disclosed then dressing the points.

The principal objects of the invention are to provide an apparatus by means of which points having spindle holes at one end are filled with a binder and then accurately assembled with their spindles. Means are then activated to fix the spindles in the wheels with the binder and thereafter the wheels are dressed. It is also an object of this invention to provide an apparatus in which the several operations may be carried out expeditiously; and to provide an apparatus which is semi-automatic.

As herein illustrated, the machine comprises a point-holding support for holding a point with its spindle-receiving hole upright, a support for a spindle situated vertically above the point support, means for effecting relative movement of the supports to embed the spindle in the binder in the spindle hole and hold the point and spindle engaged for a predetermined length of time while the binder is given at least a permanent preliminary set, a rotating dressing and truing wheel, a binder-flash removing apparatus and means which then separates the spindles from their supports. An induction heater is mounted to cooperate with the wheel or point support and there is means for effecting its operation during the period of time that the point and spindle are held engaged to activate the binder and hence to fix the point to the spindle, and there is means operable, following termination of the heating period and separation of the supports, to effect movement of the spindle support with the point attached thereto, to a position adjacent a truing or dressing wheel for dressing and a binder-flash removing tool for eliminating the excess binder displaced during insertion of a spindle into a point. The spindle support has two spindle-holding chucks arranged diametrically opposite each other and is rotatable with respect to the point support and the dressing wheel so that while one point is being attached to a spindle another point is being dressed. The dressing wheel is normally rotated continuously during operation of the apparatus and is advanced into engagement with a point which has been moved to a position adjacent it to dress the point and there is means for effecting rotation of the point relative to the wheel during the dressing operation. At the conclusion of the dressing and the binder-flash removing operations the spindle support is reversed and the completed wheel retracted. There are suitable controls for effecting cyclical operation of the machine including dual starting buttons for initiating the cycle and means operable, by reversal of the spindle support, to terminate the cycle of operation. There is also a vacuum filling apparatus for filling a hole in the points with a binder in the form of a powder preparatory to mounting them on the point support.

Figure 2:
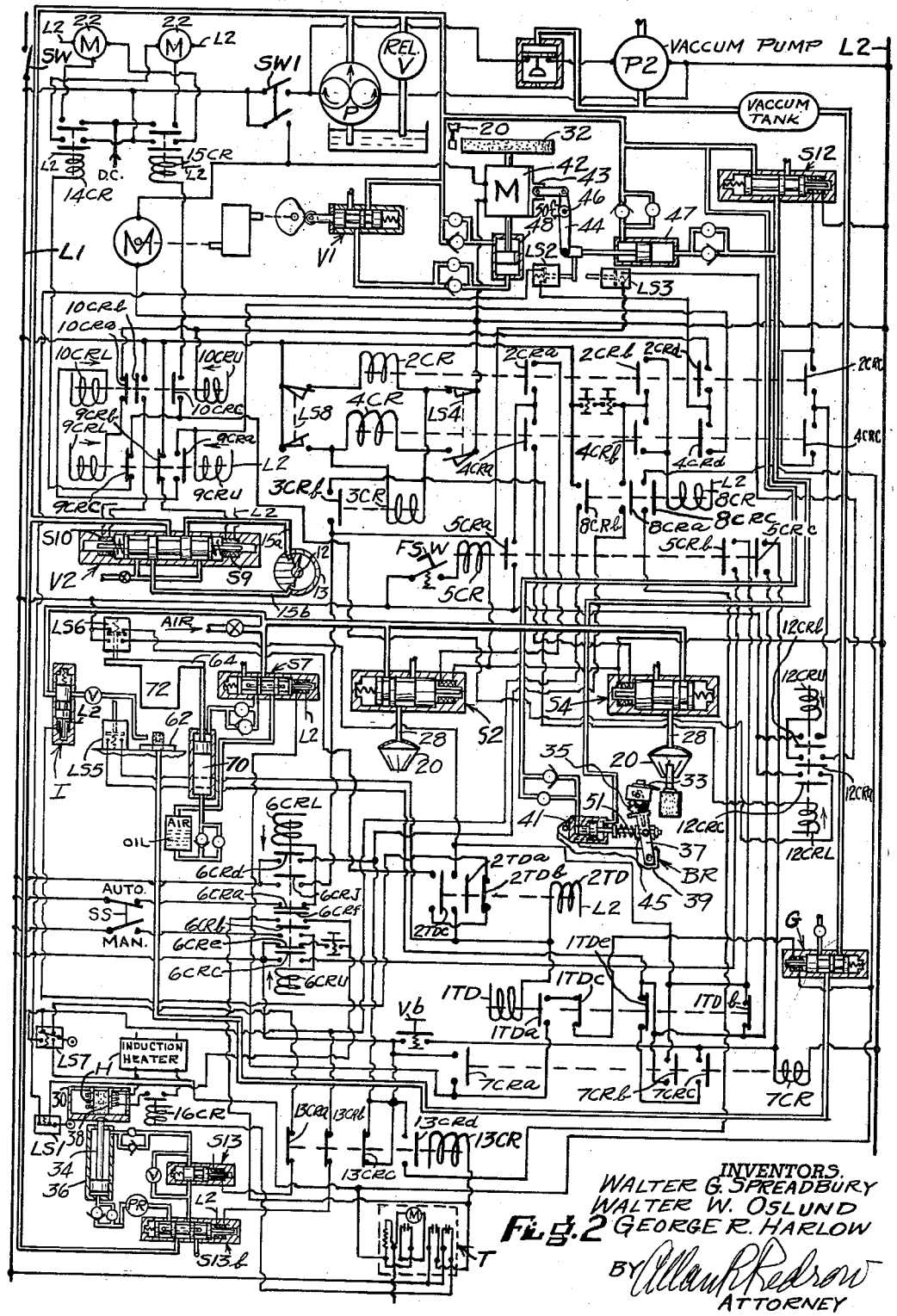

The invention will now be described in greater detail with reference to the accompanying drawing wherein:

FIG. 1 is a perspective view of the apparatus; and
FIG. 2 is a combined wiring and hydraulic diagram providing sequential control of the motors which effect operation of the several movable components of the apparatus, which are shown in diagrammatic form.

Referring to FIG. 1, the machine has a hollow base 10, a loading station LS on its front side, a dressing station DS including a binder-flash removing apparatus BR and a transfer device TD situated therebetween for transferring a point and spindle assembled at the loading station to the dressing station for dressing of the point. A filling station FS is provided for vacuum filling the points with a powder form of binder material as taught in the above mentioned Eves application which is incorporated herein by reference, including reference to the binders there mentioned. Rotation of the main vertically disposed drive shaft 12 is effected by a reversible hydraulic motor 13 situated within the base at its lower end to which pressure fluid is supplied through conduits 15$a$, 15$b$. A headblock 14 is mounted on the upper end of the shaft 12. The headblock 14 is constructed to have vertical sides which are diametrically opposite to each other to which are fastened, respectively, spindle supports 16—16 and motor supports 17—17. A shaft 19 partially shown is journaled in each support 16, each of which has a pulley 18 fixed to its upper end and a chuck 20 fixed to its lower end. A motor 22 is mounted on each support 17, each of which is provided with a driving pulley 24 for driving one of the pulleys 18 by way of a belt 26. The chucks 20—20 are adapted to be opened and closed pneumatically by supplying fluid pressure to one side of a diaphragm (not shown). To this end each shaft 19 is hollow and air is supplied through the shaft to the diaphragm by a flexible conductor 28 connected to the upper end of the shaft. The opening and closing of each chuck is controlled independently of the other by selectively operable valves so that while one chuck is closed on a spindle the other may be opened to release a spindle. In like manner, rotation of each chuck is controlled independently of the other by its motor 22.

The loading station LS comprises a point support 30 fixed to the upper end of a rod 34 protruding through the top of the base from a cylinder 36, shown in dotted lines within the base, and support 30 is movable vertically from a retracted position below the chuck at the front side of the shaft 12, upwardly toward the chuck, to bring a point mounted on it into engagement with the lower end of a spindle clamped in the chuck. The support 30 contains, at its upper end, an opening 38 within which the point may be seated so that the hole at its upper end, which has previously been filled with a binder, will be aligned with the lower end of the spindle fixed in the chuck. The support 30 also contains an induction heating unit H shown diagrammatically in the lower left hand corner of FIG. 2, by means of which the binder material occupying the spindle hole may be activated after the point is engaged with the spindle to cause the point to become fixed to the spindle.

The dressing station DS comprises a dressing wheel 32 which is mounted on a vertically disposed shaft 40 driven by a motor 42. The wheel 32 and motor 40 are mounted on a slide bearing 43 to be moved horizontally and a hydraulic motor 48 of conventional construction lifts wheel 32 vertically, motor 48 being actuated by a motor driving through a reducer to rotate a cam which shifts a hydraulic fluid control valve V1, by means of which the dressing wheel is oscillated vertically while rotating. The slide 43 is connected at one end of an arm 44, the latter being mounted intermediate its ends on a vertical shaft 46. One end of the shaft is connected to a hydraulic motor 47, by means of which the end of the arm supporting the motor and hence the dressing wheel may be advanced and retracted in a horizontal direction relative to the chuck 20 and wheel mounted on a spindle to be rotated adjacent thereto. The shaft 46 supporting the arm 44 is fixed to an adjustable wheel slide base 50 which is mounted at the top of the base 10 and is adapted to be adjusted forwardly and rearwardly relative to the shaft 12 by a screw 52, the forward end of which projects through the forward side of the base and has on it a hand wheel 54. The dressing wheel is enclosed, except for the edge adjacent the chuck, by a hood 55 and the latter is provided with an exhaust duct 57 through which particles ground or cut off of the point may be exhausted.

In addition the dressing station includes binder-flash removing apparatus BR for the purpose of eliminating the excess activated binder displaced above the surface of the points or wheels during the insertion of the spindles into holes containing the binder and during the activation thereof. The binder-flash removing apparatus comprises, as shown in FIG. 2, an adjustable flash removing tool assembly 33 pivotable and yieldably mounted on an adjustable member 35 supported by a lever 37. The lever 37 is pivotably mounted on a base 39 and is actuated by a fluid motor 41 also pivotably mounted on the base 39 at one end and connected to the lever 37 intermediate its ends by means of a block 45 adjacent to and pivotably mounted on the lever 37. The block 45 has a hole in which is slidably mounted the actuating shaft 49 of the fluid motor 41. One end of the shaft has fixed to it a collar engaging one end of the block 45 and is for the purpose of positively retracting the lever 37 and hence the tool assembly 33. Located around the shaft 49 between the other end of the block 45 and a second collar fixed to the shaft 49, is a compression spring 51. The spring 51 provides a sufficient predetermined force and stroke after it has been compressed by the engagement of the binder-flash removing tool with the cured or activated binder-flashing to advance the flash removing tool until it lightly engages the spindle without marking it, the extent of the movement being predetermined by the initial stroke of the fluid motor 41.

The binder-flash removing tool assembly 33 is arranged as shown diagrammatically in FIG. 2 to move on an arc causing the binder-flash removing tool, spring biased in a clockwise direction toward an adjustable stop screw, to continually engage the surface of the wheel as it moves toward the spindle. During this movement, the tool assembly 33 moves in a counterclockwise arc against tension of the spring of sufficient force to remove the flash but of insufficient force to cause the tool to dig into the surface of the point.

The wheel dressing and the binder-flash removing operations are performed at substantially the same time and are actuated by similar fluid motors 41 and 47 having pistons therein, the opposing ends of which are of different size and area, the piston ends of larger size being utilized to hold the mechanisms in a retracted position.

The wheel or point filling station FS comprises vacuum filling means to fill the upwardly facing spindle holes at the ends of the points with a powdered binder. The vacuum-filling means comprises a support 62 on the base 10 adapted to receive a point and to hold it upright with its open end uppermost beneath a crosshead 64 which is mounted for vertical movement between a pair of spaced parallel, upstanding rods 66—66. The crosshead is connected to a vertical rod 68 which extends downwardly therefrom through the top of the support into a hydraulic cylinder 70 so that, by supplying fluid to the cylinder 70, the crosshead 64 may be raised and lowered relative to the support 62. The crosshead carries centrally thereof a container 72 for a binder powder. The bottom of the container has an orifice (not shown), adapted to be brought into registration with the hole in the top of the point when the crosshead is lowered far enough to bring the bottom of the container into contact with the point. A suitable gasket, or the like (not shown), is fixed to the bottom of the container about the orifice so that when the container is pressed into engagement with the point a seal can be obtained. While the bottom of the container is in contact with the point a vacuum is produced to draw the powdered binder from the container into the hole in the point through the support 62 in any suitable fashion.

For convenience, receptacles R1 and R2 may be placed on top of the base at each side of the point support for holding a supply of spindles and points and a holder B containing a plurality of holes of a size to receive the finished assembled points is placed on a bracket at the front of the support to hold a quantity of points which have been dressed.

The apparatus is operated cyclically by pressing a pair of starting buttons 56L, 56R. At rest, prior to starting a cycle, the point support 30 is situated adjacent the top of the base 10 vertically below one of the chucks 20 and at a sufficient distance therefrom so that the operator can easily place a point filled with a binder, in the hole 38 at the top of the point holder 30. The chuck 20 above the support is now open by manipulation of a valve S2 or a valve S4 which selectively controls the supply of air to the diaphragm in the hollow shaft 19 to open the chuck, which is then allowed to close on the spindle to grip it. A treadle-operated switch FSW and circuitry, which will be described hereinafter, control the valves S2 and S4 so as to operate only the valve supplying pressure to the chuck which is above the point support and at the same time operates the point filling cycle at FS to begin a vacuum filling cycle for filling a point with binder. When a point and spindle have been mounted in their respective supports, the dual starting buttons are pressed whereupon the support 30 is elevated, pressing the point into proper alignment with the lower end of the spindle and embedding the spindle in the binder. The induction heating element H is now automatically energized to activate the binder so as to fix the point to the spindle. During activation of the binder the fluid pressure operating on the support 30 maintains the point in a stationary position relative to the lower end of the spindle in the hole in the point. The point and support are held aligned for a predetermined length of time whereupon the point support 30 is retracted. During elevation of the support 30, activation of the binder and retraction of the point support, the dressing wheel 32, which is rotating constantly and the binder-flash removing tool, are moved into engagement with a point which has been previously fixed to its spindle and which is now supported by the chuck at the dressing station for dressing the surface of the point including the removal of the binder-flash. After the dressing operation has been completed, the wheel 32 and binder-flash removing tool are retracted. The chuck at the dressing station is continuously rotated by its motor 22 to spin the point relative to the dressing wheel and the binder-flash removing tool during dressing.

Rotation of the shaft 12 to move a spindle and point from the loading station to the dressing station and a dressed point from the dressing station to the loading station and retraction of the dressing wheel is effected simultaneously at the conclusion of the simultaneous dressing and wheel mounting operations. The complete cycle is terminated by reversal of the rotation of spindle support 12.

Referring to the wiring diagram (FIG. 2), switch SW, shown in the upper left hand corner, when closed, supplies power to the circuit. Closing a switch SW1 initiates continuous operation of the dressing motor 42 which drives the dressing wheel, a pump P for supplying pressure fluid to the apparatus and a pump P2 which produces a vacuum for a purpose which will appear hereinafter. At this point, prior to initiation of a cycle of operation, a pair of contacts of each of the limit switches LS4 and LS3, supported in the base adjacent the motor 13, FIG. 1, are in closed and opened positions respectively, and are alternately actuated by cams 59 and 61 fixed to a shaft 63 extending downwardly from the motor and rotatable in unison with the shaft. When the normally closed contacts of the limit switch LS4 are closed and the normally open contacts of LS8 are closed, a relay 2CR will be energized thereby closing a switch 2CRa, so that the chuck situated above the point support can be opened. When the limit switch LS8 and the normally open contacts of LS4 are closed, the relay 4CR will be energized thereby closing switch 4CRa so that the other chuck, which has now been rotated into position above the point support, as will appear hereinafter, can be opened. During the rotation of the chuck from one position to the other the limit switches LS4 and LS8 are allowed to take their normal positions. With their normally open contacts open and their normally closed contacts closed, current then passes through their normally closed contacts temporarily energizing the relay 3CR closing momentarily a set of contacts 3CRb energizing relay coil 12CRL closing contacts 12CRa, 12CRb and 12CRc. Closing of contacts 12CRc energizes through whichever contact is closed, 9CRa or 10CRa, either of the relays 14CR or 15CR to start rotation of the chuck moving toward the dressing station and stopping rotation of the chuck moving toward the loading station by the closing of their respective contacts. When the chucks 20 reach their positions opposite the dressing and loading stations one or the other of the limit switches LS4 or LS8 is actuated energizing either of the relays 2CR or 4C closing all of its normally open contacts, one of which energizes the solenoid operated valve S12 starting a dressing cycle including binder-flash removal by allowing fluid under pressure to be directed to the largest pistons of the motors 41 and 47 to retract the tools. The normally open limit switch LS2 is allowed to open.

A second pair of limit switches LS1 and LS7, FIG. 1, are situated adjacent the point support and a third pair of limit switches LS2 and LS3 are supported adjacent the free end of the piston actuated by the fluid motor 47. The contacts in the switch LS1 are held closed by contact of the point support 30 in its lowermost position and the normally open contacts of the switch LS7 are open and the normally closed switch LS2 is held closed by the retracted wheel slide 43 of dressing wheel 32, and normally open switch LS3 is open if the dressing cycle has finished.

To prepare the apparatus for a cycle of operation which is normally started while a point is being dressed, a filled point is placed in the point support 30 and an unfilled point is placed on the vacuum filling means support 62. The foot switch FSW is then closed which thereby energizes a relay 5CR. Energizing relay 5CR closes switches 5CRa, 5CRb, and 5CRc starting a vacuum filling cycle and depending upon which shaft and chuck assembly is located above the work support 30 will supply current through the switch 2CRa or 4CRa to effect operation of a solenoid-controlled valve S2 or S4 for supplying air to the chuck above the point support to open it, thereby to permit the operator to insert a spindle into the chuck. Release of the treadle FSW deenergizes the relay 5CR thereby opening the switch 5CRa deenergizing S2 or S4 and thus allowing the chuck to close on the spindle and does not affect the vacuum filling cycle which continues as will be hereinafter described. If the apparatus has been set for automatic control by means of the selector switch SS, a relay coil 6CRL will be energized through the normally closed switch 6CRa.

Energizing relay 6CRL closes switch 6CRb so that if now the selector switch SS is moved to manual control, the coil relay 6CRU will be energized and hence open switch 6CRb and close switch 6CRa.

Energization of relay coil 6CRL closes a series of switches 6CRb, 6CRc, 6CRd, 6CRf, and 6CRj and opens switches 6CRa, and 6CRe.

As stated above, when the footswitch FSW was actuated it energized the relay 5CR closing a pair of switches 5CRb and 5CRc. Closing of these contacts passed current through the now closed contacts 6CRc, 5CRb, 1TDb and 5CRc energizing a relay 7CR closing its normally open contacts 7CRa, 7CRb, 7CRc. Closing of the contacts 7CRa energizes a solenoid operated valve S7 passing fluid under pressure to the cylinder 70 to move crosshead 64 and container 72 downwardly.

Movement of the crosshead downward allows the normally closed contacts of a limit LS6 to close and a set of normally open contacts to open. Closing of the normally closed contacts sets up a holding circuit to hold 7CR and valve S7 energized. When the chamber 72 is seated on the wheel to be filled with powder, contacts of a normally open limit LS5 are closed thus energizing the time delay relays 1TD and 2TD. LS6 holds 1TD and 2TD relay energized. The normally open contact 1TDa upon closing energizes a solenoid operated valve G to produce a vacuum within the hole in the wheel to suck powder from chamber 72 for filling the point. The normally closed contacts 1TDb open. Normally closed timing contacts 1TDc and 1TDe begin to time the filling period on energization of relay 1TD after which they open.

The normally open contacts 2TDa of the time delay relay 2TD close setting up the holding circuit mentioned above. The normally closed contacts 2TDb open. The normally open timing contacts 2TDc stay open and start timing on deenergization of the time delay relay 2TD after which they close.

After the filling period has elapsed the timing contacts 1TDc and 1TDe open deenergizing the relay 7CR, valve S7 and vacuum valve G to cut off vacuum and supply fluid under pressure to the opposite side of cylinder 70 moving the crosshead 64 and container 72 upwardly. As the crosshead moves upwardly the limit switch LS5 opens without effect. When the crosshead reaches the top it actuates the limit switch LS6 opening its normally closed contacts and closing its normally open contacts.

The opening of the normally closed contacts of LS6 deenergizes the time delay relays 1TD and 2TD closing the contacts 1TDb, 1TDc, 1TDe and 2TDb and opening contacts 1TDa and 2TDa. Contacts 2TDc begin timing. The closing of the normally open contacts of LS6 energizes through the timing contacts 2TDc and closed contacts 2TDb, a solenoid operated air blast valve I which allows air under light pressure to gently lift the point from the support 62. When the timing contacts 2TDc open, the air blast valve I is deenergized and air is cut off. This completes the filling cycle which is again recycled by again depressing the switch FSW as described. However, points may be filled at any time by pressing a manually operated push button Vb for one cycle as described.

Having clamped a spindle in the chuck above the work support 30, dual starting push button switches 56L, 56R are now pressed. Closing push button switches 56L and 56R supplies current through closed switch 2CRb to relay 8CR to energize the same. Energizing relay 8CR closes switches 8CRa, 8CRb, and 8CRc. Closing switch 8CRa establishing a holding circuit through the closed switch 6CRd to hold the relay 8CR energized when the push buttons are released.

Closing switch 8CRb supplies current through a normally closed contact of the limit switch LS7 and through normally closed switches S13CRa and 13CRb to energize a pair of solenoid-operated valves S13 and S13b for supplying fluid pressure to the motor 36 at full pressure to elevate the point support 30 rapidly up to the chuck supporting the spindle. As the point support nears the upper end of its movement it opens the normally closed contact of the limit switch LS7 deenergizing S13 and closing the normally open contact thereof. The closed switch 8CRb supplies power now through the normally closed switch 13CRb to maintain the solenoid-operated valve S13b energized for supplying fluid pressure to the motor 36 at a slower rate to slow down to a stop and hold the point support as the point comes into proper alignment with the lower end of the spindle. Closing the normally open contact of the switch LS7 energizes a microflex timer T which, in turn, supplies current to energize a relay 16CR and in turn the induction heater H. As previously pointed out, the coil of the induction heater H is mounted within the point support and is operable to heat the spindle which activates the binder so as to fix the point to the lower end of the spindle. At the end of the heating period the timer T opens a set of contacts deenergizing relay 16CR and in turn deenergizes induction heater H and closes contacts which supply current energizing the relay 13CR opening its normally closed contacts 13CR$a$, 13CR$b$, 13CR$c$ and closing its normally open contacts 13CR$d$ to hold the microflex clutch energized. Opening of 13CR$b$ contacts deenergizes solenoid-operated valve S3$b$ which supplies pressure fluid to the motor 36 in a direction to lower the support 30.

As described above, during rotation of the chucks 20 from one station to the other current is supplied through switch 6CR$j$ and closes switch 3CR$b$ to a relay 12CRL which, in turn, closes switches 12CR$a$ and 12CR$b$. Closing switch 12CR$b$ energizes the solenoid-operated valve S12 which allows fluid pressure to exhaust from the fluid motor 41 and 47 through now closed switch 2CR$c$ to advance the dressing wheel and the binder-flash removing apparatus up to the work, consequently opening the limit switch LS2. At the end of the infeed of the dressing wheel and of the binder-flash removing tool the limit switch LS3 is closed energizing relay 12CRU opening the contacts 12CR$a$, 12CR$b$, and 12CR$c$ deenergizing valve S12, 14CR or 5CR retracting the dressing wheel and the binder-flash removing tool assembly closing the limit switch LS2 and stopping the rotation of the chuck ending the dressing cycle.

The limit switches LS1 and LS7 are returned to their initial position by retraction of the support 30, hence current can now flow through the now closed contacts of the timer and switch 6CR$f$, limit switch LS1, limit switch LS2, switch 2CR$d$ or switch 4CR$d$ whichever is closed, and a normally closed switch 9CR$a$ or 10CR$a$ to energize the relay coil 9CRL or 10CRL, thereby closing a switch 9CR$b$ or 10CR$b$. Closing the switch 9CR$b$ or 10CR$b$ energizes either a solenoid S9 or S10 operated valve V2 which supplies fluid pressure to the motor 13 to rotate the shaft 12 either counterclockwise or clockwise and hence to transfer the trued spindle point assembly from the dressing station to the loading station and simultaneously to transfer a spindle and point to the dressing station for dressing. During rotation of the shaft 12, the cams referred to above allow opening of the normally open contacts and closing the normally closed contacts of limit switch LS8 and the closing of the normally closed and opening the normally opened contacts of limit switch LS4 which, in turn, deenergizes relay 2CR or 4CR and energizes relay 3CR as described above. This, in turn, opens switch 2CR$b$, 4CR$b$ deenergizing relay 8CR and closes switch 3CR$b$ energizing 12CRL. Contact 12CR$c$ closes, energizing either CR14 or CR15 to start rotation of the chuck approaching the dressing station and to stop rotation of chuck approaching the loading station. Deenergizing 8CR opens contacts 8CR$a$, 8CR$b$ and 8CR$c$ resets the microplex timer, opens a set of its contacts to deenergize CR13 for opening and closing its contacts respectively as shown in FIG. 2 and make the circuit ready for the next cycle to follow. When the chucks have indexed either the limit switch LS4 or LS8 is actuated again energizing one of the relays 2CR or 4CR closing its contacts which immediately energize S12 to begin a dressing cycle, while the operator is unloading, loading and vacuum filling a new point as above described. To initiate the next cycle, the dual push buttons 56L and 56R must be repressed to supply current to the relay 8CR through the switch 2CR$b$ or 4CR$b$. The cycle may be repeated as often as the dual starting buttons 56L and 56R are pressed.

It should be understood that the present disclosure is for the purpose of illustration only and that this invention includes all modifications and equivalents which fall within the scope of the appended claims.

We claim:
1. Apparatus for making spindle-supported grinding points, comprising a support adapted to hold a point containing a hole at one end which has previously been filled with an activatable binder with the hole uppermost, a dressing wheel, a support adapted to hold a spindle above the point support and to be moved therefrom to a position adjacent the dressing wheel, said point support being movable up to the spindle support to embed the lower end of a spindle in a point and containing induction heating means for activating the binder, and control means operable to raise the point support to engage the point with the spindle, hold the point and spindle engaged for a predetermined length of time and then lower the point support, energize the induction heating means during the time the point and spindle are held engaged and following lowering of the point support move the spindle support to said position adjacent the dressing wheel preparatory to dressing.

2. Apparatus according to claim 1, wherein the means for effecting relative movement of the point support to embed the lower end of the spindle in the binder in the point maintains yielding pressure between the point and spindle throughout activation of the binder.

3. Apparatus according to claim 1, comprising means rotatably mounting the spindle on the spindle support, and means operable, by the control means to effect rotation of the rotatable means to rotate the point relative to the wheel.

4. Apparatus according to claim 1, comprising a chuck on said spindle support, and means for opening and closing the chuck to receive a spindle for attachment of a point thereto and releasing the spindle following dressing of the point.

5. Apparatus according to claim 1, comprising a pneumatically operable chuck on the spindle support, and means for controlling the supply of pressure fluid thereto to open and close the chuck.

6. Apparatus according to claim 1, comprising fluid operable means for effecting movement of the point support up to the spindle support to engage the spindle and point and to retract the point support, and a timer for controlling operation of said fluid operable means so as to hold the supports in proximity during the activation of the binder.

7. Apparatus according to claim 1, comprising fluid operable means for raising and lowering the point support, valve means for supplying fluid pressure to the fluid operable means, means for shifting the valve means in a direction to raise the point support up to the spindle support, a timer, a switch operable, by movement of the supports into proximity, to initiate operation of the timer, and another switch operable, by termination of the operation of the timer, to reverse the valve means to lower the point support.

8. Apparatus according to claim 1, comprising first fluid operable means for raising and lowering the point support, second fluid operable means for moving the spindle support from the position adjacent the point support to the position adjacent the dressing wheel and the binder-flash removing tool, valve means for supplying fluid pressure to the first and second fluid operable means, control means for shifting the valve means to supply fluid pressure to the first fluid operable means to raise the point support up to the spindle support and hold the spindle support adjacent the point support, a timer, a first switch operable, by movement of the supports into proximity, to initiate operation of the timer, and second and third switches operable, after termination of the operation of the timer, to shift the control means to lower the point support and move the spindle support to the position adjacent the wheel.

9. Apparatus according to claim 7, wherein the timer controls the duration of operation of the induction heater.

10. In an apparatus for making spindle-supported grinding points, a loading station and a dressing station, a point support at said loading station for supporting a point containing a hole at one end which has been filled with an activatable binder with the end containing the hole uppermost, a rotating dressing wheel at said dressing station, a transfer device situated between the loading station and the dressing station mounting a pair of rotatable spindle supports so arranged that when one is above the point support at the loading station the other is adjacent the wheel at the dressing station, said transfer device being movable to reverse the position of the spindle support, said point support being movable up to the spindle support at the loading station to embed the lower end of a spindle in the binder in the point and containing induction heating means, and said dressing wheel being movable from a retracted position up to the spindle support at the dressing station to engage a point supported by the spindle support for dressing, and control means for effecting operation of said movable means, at the loading station to raise the point support to engage a point supported thereby with a spindle fixed in the spindle support, hold the point and spindle engaged for a predetermined length of time, effect energization of the induction heater during said period and then lower the point support, and at the dressing station to rotate the spindle support and advance the wheel into engagement with the point, and means operable, at the conclusion of the dressing operation, to effect reversal of the point support and retraction of the wheel.

11. Apparatus according to claim 10, wherein the apparatus is cyclically operable and comprises dual starting buttons in the control circuit operable to initiate a cycle of operation, and means operable, by reversal of the transfer means, to terminate operation of the cycle.

12. In an apparatus for making spindle-supported grinding points, a loading station and a dressing station, a point support at said loading station for supporting a point containing a hole at one end which has been filled with a binder with the end containing the hole uppermost, a rotating dressing wheel at said dressing station, a transfer device situated between the loading station and the dressing station mounting a pair of rotatable chucks so arranged that one is above the point support at the loading station and the other is adjacent the wheel at the dressing station, said transfer device being rotatable to reverse the position of the chucks, said point support being movable up to the chuck at the loading station to embed the lower end of the spindle in the binder in the point and containing an induction heater, and said dressing wheel being movable from a retracted position into engagement with a point supported at the dressing station, fluid operable means for effecting movement of the point support, wheel and transfer device, and control means for supplying fluid pressure to said fluid operable means, at the loading station to raise the point support to engage a point supported thereby with a spindle fixed in the spindle support, hold the point and spindle engaged for a predetermined length of time, effect energization of the induction heater during said period, and then lower the point support, and at the dressing station to rotate the chuck and advance the wheel into engagement with the point supported thereby, and means operable, at the conclusion of the dressing operation, to reverse the transfer means and retract the wheel.

13. Apparatus according to claim 12, comprising fluid operable means for opening and closing the chucks, a treadle operable to condition the fluid operable means for operation, and means in the control circuit operable to render the fluid operable means of the chuck adjacent the loading station at any given time operable and that adjacent the dressing station inoperable.

14. Apparatus according to claim 12, comprising motors for rotating the chucks, and means in the control circuit operable to render the motor associated with the chuck adjacent the dressing station at any given time operable and that at the loading station inoperable.

15. Apparatus for manufacturing spindle-supported grinding points comprising a loading station, a support at the loading station for supporting a point containing a hole at one end which has been previously filled with a binder with the end containing the hole uppermost, a dressing station, means supporting a dressing wheel at said dressing station for movement from a retracted position up to the station, a rotatable transfer device situated between the loading station and the dressing station supporting in diametrically disposed relation two rotatable spindle-supporting chucks, one in a position vertically above the point support and the other adjacent the wheel, motor means operable to raise the point support up to the chuck on the transfer device to engage a point with the lower end of the spindle fixed in the chuck, an induction heater on the point support movable therewith and operable, after engagement of the point with the spindle, to activate the binder, said motor means being operable, following activation of the binder, to lower the point support leaving the point supported by the spindle, motor means for effecting rotation of the transfer device following lowering of the point support to move the spindle with the point fixed thereto to the dressing station, means operable, concomitantly with the assembly of the point and spindle, activation of the binder and retraction of the point support at the loading station, to effect rotation of the chuck at the dressing wheel, and advance the wheel into engagement with the rotating point to dress the point, and means operable, following reversal of the transfer device, to retract the wheel and terminate operation of the apparatus.

16. Apparatus for making spindle-supported grinding points, comprising a support adapted to hold a point containing a hole at one end which has previously been filled with an activatable binder with the hole uppermost, a dressing wheel, a binder-flash removing tool, a support adapted to hold a spindle above the point support and to be moved therefrom to a position adjacent the dressing wheel, said point support being movable up to the spindle support to embed the lower end of a spindle in a point and containing induction heating means for activating the binder, and control means operable to raise the point support to engage the point with the spindle, hold the point and spindle engaged for a predetermined length of time and then lower the point support, energize the induction heating means during the time the point and spindle are held engaged and following lowering of the point support move the spindle support to said position adjacent the dressing wheel and the binder-flash removing tool preparatory to dressing.

References Cited in the file of this patent

UNITED STATES PATENTS

| | | |
|---|---|---|
| 2,704,705 | Gifford | Mar. 22, 1955 |
| 2,907,148 | Sheets | Oct. 6, 1959 |
| 2,963,926 | Fantozzi et al. | Dec. 13, 1960 |
| 2,980,966 | Praeg | Apr. 25, 1961 |
| 3,034,378 | Anderson | May 15, 1962 |